UNITED STATES PATENT OFFICE.

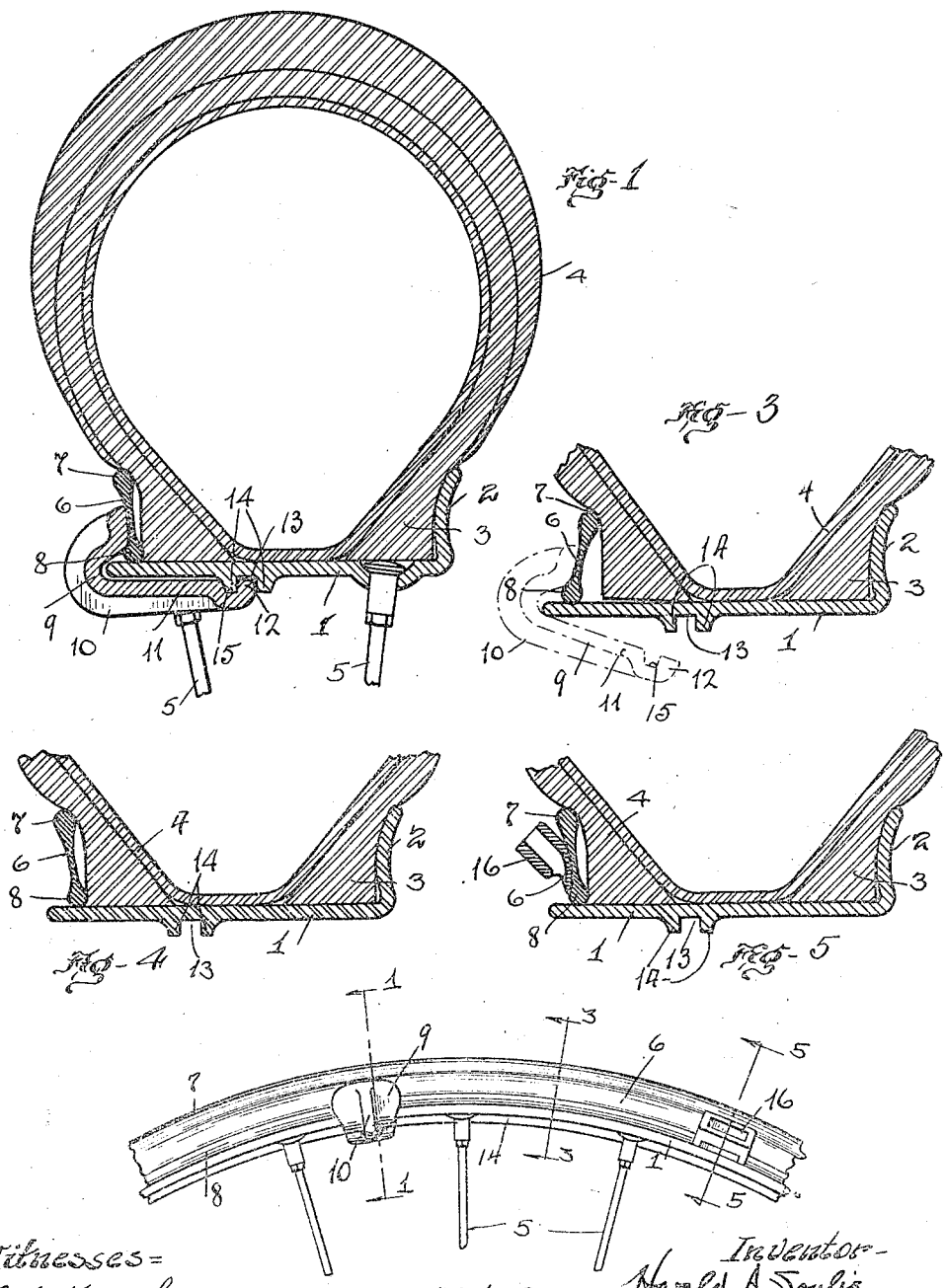

HAROLD A. SOULIS, OF NEW YORK, N. Y., ASSIGNOR OF ONE-HALF TO WILBUR T. SOULIS, OF NEW YORK, N. Y.

LOCKING MECHANISM FOR VEHICLE-TIRES.

1,170,695.   Specification of Letters Patent.   Patented Feb. 8, 1916.

Application filed November 13, 1914. Serial No. 871,870.

*To all whom it may concern:*

Be it known that I, HAROLD A. SOULIS, a citizen of the United States, and a resident of New York, county of New York, and State of New York, have invented a new and useful Improvement in Locking Mechanism for Vehicle-Tires, of which the following is a specification, the principle of the invention being herein explained and the best mode in which I have contemplated applying that principle, so as to distinguish it from other inventions.

The subject of the present invention is a new and improved type of vehicle wheel rim and relates in particular to an improved means for retaining the tire upon the rim. In the wheel rims now in use, there are usually provided what is known as a removable flange upon one side of the rim which is positioned on the rim against the side of the tire and is then locked in place by a split locking ring. Practically all of the so-called "quick detachable" rims now in use on automobile wheels are of this general type. One disadvantage of this type is in the difficulty of positioning and removing the flange and the locking ring, which often rust into place and are usually secured by means of small terminal lugs which are inserted in recesses in the rim.

In the present invention I obviate the necessity for the employment of two removable members and provide a single detachable flange which is adapted in one position to be freely moved on to or off from the rim. Such member is also adapted when positioned on a rim, to be bent or twisted so that locking means mounted thereon are adapted to interlock with coöperative means on the rim. This locking member when in such position is adapted to be maintained against movement by the pressure of the pneumatic tire against the same.

To the accomplishment of the foregoing and related ends, said invention, then, consists of the means hereinafter fully described and particularly pointed out in the claims.

The annexed drawing and the following description set forth in detail certain mechanism embodying the invention such disclosed means constituting, however, but one of various mechanical forms in which principle of the invention may be used.

In said annexed drawing:—Figure 1 is a transverse section through a rim embodying my present invention on the line 1—1, Fig. 2; Fig. 2 is a partial side elevation of the rim shown in Fig. 1; Fig. 3 is a section on the line 3—3 in Fig. 2 showing the locking member when first applied to the rim; Fig. 4 is a similar section taken on the line 3—3 in Fig. 2 but showing the locking member when moved into another position, and Fig. 5 is a similar section on the line 5—5, Fig. 2.

In Fig. 1 there is shown a felly band 1, provided upon one side with a permanent up-standing flange 2 against which is adapted to rest the locking portion or bead 3 of a pneumatic tire 4. It will be understood that I do not limit the use of my invention to pneumatic tires, as any tire which is compressible at its base may be used in my improved rim and I am showing the present pneumatic tire for purposes of illustration only. Similarly, although I have shown metal spokes 5, extending inwardly from the felly band, it will be understood that my improved rim is capable of a universal adaptation, irrespective of the type of spokes.

The locking member which I employ consists of a continuous annular ring of relatively flexible material and of a substantially flat cross-section. Such ring 6 is formed to normally assume a position such, for example, as indicated in Fig. 1, the greatest transverse dimension of the ring lying at an angle to a plane through either edge parallel to the plane of the wheel. The ring 6 is provided at its outer and inner edges with enlarged rounded portions or beads 7 and 8, which are adapted to contact the tire. Attached to the outer side of the ring 6 are a number of lugs 9 provided with reinforcing ribs 10 and having inwardly projecting fingers 11, such fingers terminating in lugs 12 which are adapted in one position of the ring (the position shown in Fig. 1) to engage in recesses 13, formed between two inwardly projecting ribs or lugs 14 on the under side of the rim 1. Similarly the finger 11 is formed with a recess 15 on its upper side adapted to receive one of the ribs 13. The ribs and recesses on the rim coöperate with the fingers and the lugs and recesses therein, on the ring, to form locking means which are adapted in the position illustrated in Fig. 1 to interlock and maintain the ring 6 in the position indicated. At several convenient points around the ring 6 there are mounted sockets 16 for the reception of suitable tools for operating the ring in the manner to be presently described. The ring 6 will be seen to constitute a distortible member capable of assuming either of two positions, it being necessary to distort the ring to move it from one position to anonther. To thus distort the ring requires a considerable amount of force which can be applied readily enough by an operator when employing the leverage obtainable by inserting a handled tool in the sockets 16. On the other hand the pressure exerted by the air in the tire prevents any accidental distortion of the ring during operation of the vehicle.

From the foregoing description it will be understood that the ring or annulus 6 is resilient and is normally inclined at a slight angle to a plane passing from either edge and parallel to the plane of the wheel. The method of application of this locking member on a rim is as follows: The outer bead or toe of the tire is forced inwardly as indicated in Fig. 3 and the locking ring 6 is then applied to the rim when in the position indicated in this figure: namely, with the ring inclined toward the center of the tire. When in this position the lugs are spaced from the under side of the rim and the fingers 11 on the lugs 9 do not engage the ribs 14 and recesses 13 on the rim 1. In order to lock the ring 6 in this position, only one operation is necessary, which involves the springing or bending of the ring into the position shown in Figs. 1 and 4, which may be readily and conveniently accomplished by inserting suitable handled tools in the notches 16. Screw drivers or similar instruments may for example be employed in the sockets 16, although preferably special tools will be furnished. When the ring 6 has thus been sprung into the position shown in Figs. 1 and 4, the lugs 12 engage between the ribs 14. The tire is then inflated and the greatest pressure of the tire is inserted against the upper portion or bead 7 of the ring 6, thus tending to force the same downward and outward, which tendency is resisted both by the contact of the lower bead 8 against the rim, and by engagement of the lugs 13 between the ribs 14. To disengage the ring, the operation is reversed, the tools being inserted in the sockets 16 and the ring being then sprung inwardly; and it will be understood that this cannot be done until the tire has been deflated.

My improved construction is extremely simple and inexpensive to manufacture, which characteristics render it peculiarly suitable for the automobile now being produced, in which simplicity, low cost and light weight are essentials. An additional advantage is the security of the attachment of the locking means to the rim. If a tire is punctured the weight of the vehicle tends to force the locking rim in the same direction as did the pressure in the tire, thereby preventing the ring from falling off the rim.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle wheel, the combination with a tire retaining felly-band and a retaining flange on one side thereof, of a continuous, relatively flexible ring adapted to be positioned upon the other side of said felly-band and constituting the other retaining flange thereon, and coöperative locking means mounted on said band and said ring and adapted, in one position of the latter, to interlock, thereby maintaining a tire upon said felly-band.

2. In a vehicle wheel, the combination with a tire retaining felly-band and a retaining flange on one side thereof, of a continuous, relatively flexible ring adapted to be positioned upon the other side of said felly-band and constituting the other retaining flange thereon, and coöperative locking means permanently mounted, partly on said ring and partly on said flange and adapted, in one position of said ring, to interlock, thereby maintaining a tire upon said felly-band.

3. In a vehicle wheel, the combination with a tire receiving felly band and a retaining flange on one side thereof, of a continuous relatively flexible ring adapted to be positioned upon the other side of said felly band, a rib formed on the under side of said relatively flexible ring adapted to be positioned upon the other side of said felly band, said band having recesses formed on its under side, and lugs attached to said ring and adapted, in one position of the same, to engage in such recesses in said felly band.

4. In a vehicle wheel, the combination with a tire receiving felly band and a retaining flange on one side thereof, of a continuous annular, relatively flat, and resilient ring normally having its longest transverse dimension at an angle to the plane of the edge of said ring, said ring being adapted to be positioned on the other side of said felly band, said band having recesses formed in its under side, and lugs attached to said ring and adapted, in the tire engaging position of said ring, to enter such recesses.

5. In a vehicle wheel, the combination with a tire receiving felly band and a retaining flange on one side thereof, of a continuous annular, relatively flat, and resilient ring normally having its longest transverse dimension at an angle to the plane of the edge of said ring, said ring being adapted to be positioned on the other side of said felly band, said band having recesses formed in its under side, and a plurality of lugs integrally attached to the outside of said ring and having fingers extending under said felly band and adapted to enter such recesses when said ring is in its tire engaging position.

6. In a vehicle wheel, the combination with a tire receiving felly band and a retaining flange on one side thereof, of a continuous annular, relatively flat, and resilient ring normally having its longest transverse dimension at an angle to the plane of the edge of said ring, said ring being adapted to be positioned on the other side of said felly band when its outer edge inclined toward the center plane of said band, said band and said ring having coöperative locking means adapted to interlock upon said ring's movement into a position where it is inclined away from the center plane of said band, and sockets formed on said ring for the introduction of suitable handled tools for so bending said ring.

7. In a vehicle wheel, the combination with a tire receiving felly-band, and a retaining flange on one side thereof, of a continuous, normally frusto-conically shaped resilient ring adapted to be initially positioned on the other side of said felly-band from said retaining flange, inclining toward the latter, lugs attached to said ring and extending beneath said felly-band, and the latter being provided with a contact surface adapted to be engaged by said lugs upon said ring being snapped into a position inclining away from said retaining flange.

8. In a vehicle wheel, the combination with a tire receiving felly-band having a retaining flange on one side thereof, but being otherwise flat, ribs formed on the bottom of said felly-band and spaced from the sides thereof, a continuous ring adapted to be positioned upon the other side of said felly-band and constituting a tire retaining flange thereon, lugs attached to the outer side of said ring and extending under said felly-band and being adapted to engage said ribs thereon upon turning of said ring outwardly.

9. In a vehicle wheel, the combination with a tire receiving felly-band having a retaining flange on one side thereof, and being provided with a contact surface on its lower side, a continuous, flexible ring adapted to be positioned upon the other side of said band from such retaining flange and initially inclined toward the same, lugs mounted on the outer side of said ring and extending beneath said felly-band, said ring being adapted to be sprung into a position inclining away from such retaining flange, thereby engaging said lugs against such contact surface on said felly-band, said ring being formed to smoothly contact the side of a tire previously placed on said felly-band and serve as a second retaining flange for the same.

10. In a vehicle wheel, the combination with a tire receiving felly-band and a retaining flange on one side thereof, of a continuous ring adapted to be positioned upon the other side of said felly-band in a predetermined circumferential position and thereby serving as a second tire retaining flange, said ring being capable of assuming two angular positions with respect to the plane of the wheel, and coöperative locking means permanently mounted on said band and said ring and adapted, in one angular position of the latter with respect to the plane of said wheel, to interlock, thereby maintaining a tire upon said felly-band.

11. In a vehicle wheel, the combination of a tire retaining felly-band and a retaining flange on one side thereof, of a continuous, angularly distortible ring positioned upon the other side of said band and constituting the other retaining flange thereon, said ring bearing locking means adapted, upon distortion of said ring in one direction, to engage said felly-band.

12. In a vehicle wheel, the combination with a tire retaining felly-band and a retaining flange on one side thereof, of a continuous, angularly distortible ring adapted to be positioned upon the other side of said felly-band and constituting the other retaining flange thereon, and lugs constructed to engage said ring and said felly-band and maintained in such engagement by the outward pressure of the tire against said ring, said lugs being disconnected from said felly-band.

13. In a vehicle wheel, the combination of a tire retaining flange on one side thereof, of a continuous, angularly distortible ring positioned upon the other side of said band and constituting the other retaining flange thereon, said ring bearing locking means adapted to engage said felly-band in one angular position of said ring, said ring then receiving the lateral pressure of the tire in a direction tending to maintain it in such position.

Signed by me, this 2nd day of Nov., 1914.

HAROLD A. SOULIS.

Attested by—
 THOMAS F. HART,
 A. M. LINDENSTRUTH.